US011176301B2

(12) United States Patent
Neves et al.

(10) Patent No.: US 11,176,301 B2
(45) Date of Patent: Nov. 16, 2021

(54) NOISE IMPACT ON FUNCTION (NIOF) REDUCTION FOR INTEGRATED CIRCUIT DESIGN

(71) Applicant: International Business Machines Corporation, Armonk, NY (US)

(72) Inventors: Jose Neves, Poughkeepsie, NY (US); Adam Matheny, Hyde Park, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 292 days.

(21) Appl. No.: 16/561,212

(22) Filed: Sep. 5, 2019

(65) Prior Publication Data

US 2021/0073346 A1 Mar. 11, 2021

(51) Int. Cl.
  *G06F 30/367* (2020.01)
  *G06F 30/39* (2020.01)
  *G06F 119/10* (2020.01)

(52) U.S. Cl.
  CPC ............ *G06F 30/367* (2020.01); *G06F 30/39* (2020.01); *G06F 2119/10* (2020.01)

(58) Field of Classification Search
  USPC ....................................................... 716/115
  See application file for complete search history.

(56) References Cited

U.S. PATENT DOCUMENTS

| 6,272,668 B1 | 8/2001 | Teene |
| 6,678,870 B2 | 1/2004 | Okada et al. |
| 7,010,763 B2 | 3/2006 | Hathaway et al. |
| 7,062,731 B2 | 6/2006 | Tetelbaum |
| 7,062,737 B2 | 6/2006 | Tetelbaum et al. |
| 7,093,223 B2 | 8/2006 | Becer et al. |
| 7,685,549 B2 | 3/2010 | Sinha et al. |
| 7,962,876 B2 | 6/2011 | Oh et al. |
| 2004/0199879 A1 | 10/2004 | Bradfield et al. |
| 2005/0060675 A1* | 3/2005 | Tetelbaum ............ G06F 30/367 716/115 |
| 2006/0031796 A1 | 2/2006 | Meaney |

(Continued)

OTHER PUBLICATIONS

Becer et al. "Crosstalk noise control in an SoC physical design flow," https://ieeexplore.ieee.org/document/1278526, Mar. 30, 2004. 1 Page.

(Continued)

*Primary Examiner* — Mohammed Alam
(74) *Attorney, Agent, or Firm* — Cantor Colburn LLP; Margaret McNamara (57) ABSTRACT

Techniques for noise impact on function (NIOF) reduction for an integrated circuit (IC) design are described herein. An aspect includes receiving a list of victim nets in which NIOF failures are present in an IC design. Another aspect includes attempting NIOF correction in each victim net of the list of victim nets. Another aspect includes, based on a failure of a NIOF correction in at least one victim net of the list of victim nets, saving the at least one victim net to a wire promote/demote list. Another aspect includes updating the list of victim nets based on the NIOF correction. Another aspect includes, based on determining that the updated list of victim nets is empty, promoting or demoting the at least one victim net from the wire promote/demote list in the IC design.

20 Claims, 5 Drawing Sheets

(56) References Cited

U.S. PATENT DOCUMENTS

| | | | |
|---|---|---|---|
| 2006/0112359 A1* | 5/2006 | Becer | G06F 30/3312 716/113 |
| 2006/0206843 A1* | 9/2006 | Zarkesh-Ha | G06F 30/367 716/115 |
| 2007/0226673 A1* | 9/2007 | Habitz | G06F 30/398 716/113 |
| 2021/0073346 A1* | 3/2021 | Neves | G06F 30/39 |

OTHER PUBLICATIONS

Chakraborty et al. "A signal integrity-driven buffer insertion technique for post-routing noise and delay optimization," https://ieeexplore.ieee.org/abstract/document/1012759, May 15, 2002. 1 page.

Duarte et al.; "Thermal Sensor Variation Reduction in Deep Sub 100nm Process Technologies"; IEEE Sensors 2010 Conference; 2010; pp. 1382-1385.

List of IBM Patents or Patent Applications Treated as Related; Appendix P Filed Aug. 10, 2021; 2 Pages.

Strevig et al.; "Noise Impact on Function (NIOF) Reduction for Integrated Circuit Design"; U.S. Appl. No. 17/397,197, filed Aug. 9, 2021.

Transmittal Form PTO/SB/21 signed Mar. 16, 2020.

\* cited by examiner

NOISE IMPACT ON FUNCTION (NIOF) REDUCTION FOR INTEGRATED CIRCUIT DESIGN

BACKGROUND

The present invention generally relates to integrated circuits (ICs), and more specifically, to noise impact on function (NIOF) reduction for an IC design.

In an IC, signal coupling may potentially generate timing failures and/or logic failures. In a timing failure, additional coupling delay may increase slack and/or signal slew in the IC, leading to timing errors. In a logic (or functional) failure, a voltage coupling may be high and/or wide enough to change the signal state at an input of a logic device such that the output state of the logic device is flipped, leading to propagated logic errors. An IC design may be examined for such errors before manufacturing of a physical IC based on the IC design.

SUMMARY

Embodiments of the present invention are directed to noise impact on function (NIOF) reduction for an integrated circuit (IC) design. A non-limiting example computer-implemented method includes receiving a list of victim nets in which NIOF failures are present in an IC design. The method also includes attempting NIOF correction in each victim net of the list of victim nets. The method also includes, based on a failure of a NIOF correction in at least one victim net of the list of victim nets, saving the at least one victim net to a wire promote/demote list. The method also includes updating the list of victim nets based on the NIOF correction, wherein updating the list of victim nets comprises determining whether a new victim net was caused by the NIOF correction. The method also includes, based on determining that the updated list of victim nets is empty, promoting or demoting the at least one victim net from the wire promote/demote list in the IC design.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

One or more embodiments of the present invention provide noise impact on function (NIOF) reduction for an integrated circuit (IC) design. In a NIOF, or functional, failure, a gate in a victim net in the IC design changes its output logic state (signal switching) due to noise that is injected into one or more inputs of the gate. The noise injection may occur because of capacitive coupling in the IC, due to routed signals being relatively close to one another such that sufficient voltage is generated to change the signal state in the victim net. Increasing the physical separation between wires to reduce the capacitive coupling, or shielding the wires to eliminate the capacitive coupling, may not be possible due to space constraints.

Various correction techniques may be applied to incrementally correct NIOF failures in a 3-dimensional wired IC design, including but not limited to gate repower, gate threshold voltage (Vt) swap, moving a wire or net to different layers in the IC design (e.g., promotion or demotion), increasing the physical space between a victim net and neighboring nets, and inserting a buffer into the victim net to reduce capacitive coupling. The capacitive coupling to a victim net (e.g., a line) may be reduced with the addition of a buffer in the midpoint of the coupling line. Noise may also be reduced by isolating a net or wire by moving the net or wire up to a next layer (promoting) or down to a lower layer (demoting) in the IC chip. The term net may refer to a logical connection, and the term wire may refer to a physical connection.

NIOF reduction for an IC design may include application of various correction techniques to the IC design through multiple iterations. There may be a maximum number of iterations (e.g., a limit) defined for NIOF reduction in some embodiments. In the 3-dimensional routing domain, a functional fail in a victim net may be caused by noise contributions from multiple different neighboring nets (e.g., aggressor nets). Determining and reducing the noise contributed by each of the neighboring nets to fix the NIOF failure may be a complex process due to the dual nature of an NIOF failure. A net identified as a victim is also an aggressor to its aggressor(s). The level of coupling and signal strength determines whether aggressors are also in the initial victims list. However, there are many cases where the coupling to an aggressor may not be enough to generate a signal that identifies the aggressor as also being a victim. The nets identified as aggressors and victims may change as fixes are applied to a current list of victims. For example, the insertion of a buffer on a victim net reduces and/or fixes the NIOF fail on the victim net. At the same time, the insertion of the buffer also changes the noise profile of the victim with respect to its aggressors, potentially increasing the victim's coupling contribution into the aggressors. In some aggressors, this increase maybe be enough for the coupling signal to reach or exceed the limits to classify the aggressor net as a victim. An IC design may be analyzed after a NIOF fix, and the list of victim nets may be updated to account for new victim nets not only in the original set of victim nets and associated aggressors, but also any other net in the design. Each of the multiple aggressor nets may be examined individually to determine which noise contributors may be modified to correct the NIOF failure with relatively low impact on the overall IC design. Neighboring nets that fail due to a change (e.g., a buffer being added, or a wire rerouting) in a victim net or an aggressor net may be identified and corrected. The set of failing nets may be dynamically updated as functional failures are corrected in the IC design. The dynamic updating may reduce a number of functional failures in the IC without creating noise impact on timing (NIOT) failures or timing failures (e.g., nets with negative slack and/or pins exceeding slew limits). Identification and correction of any NIOF failures may be performed after the IC design is fully routed in the physical domain, and after the IC design is determined to be positive in terms of slack. Full routing may be needed to determine relatively accurate 3-dimensional coupling scenarios that allow NIOF analysis.

Figure 1:
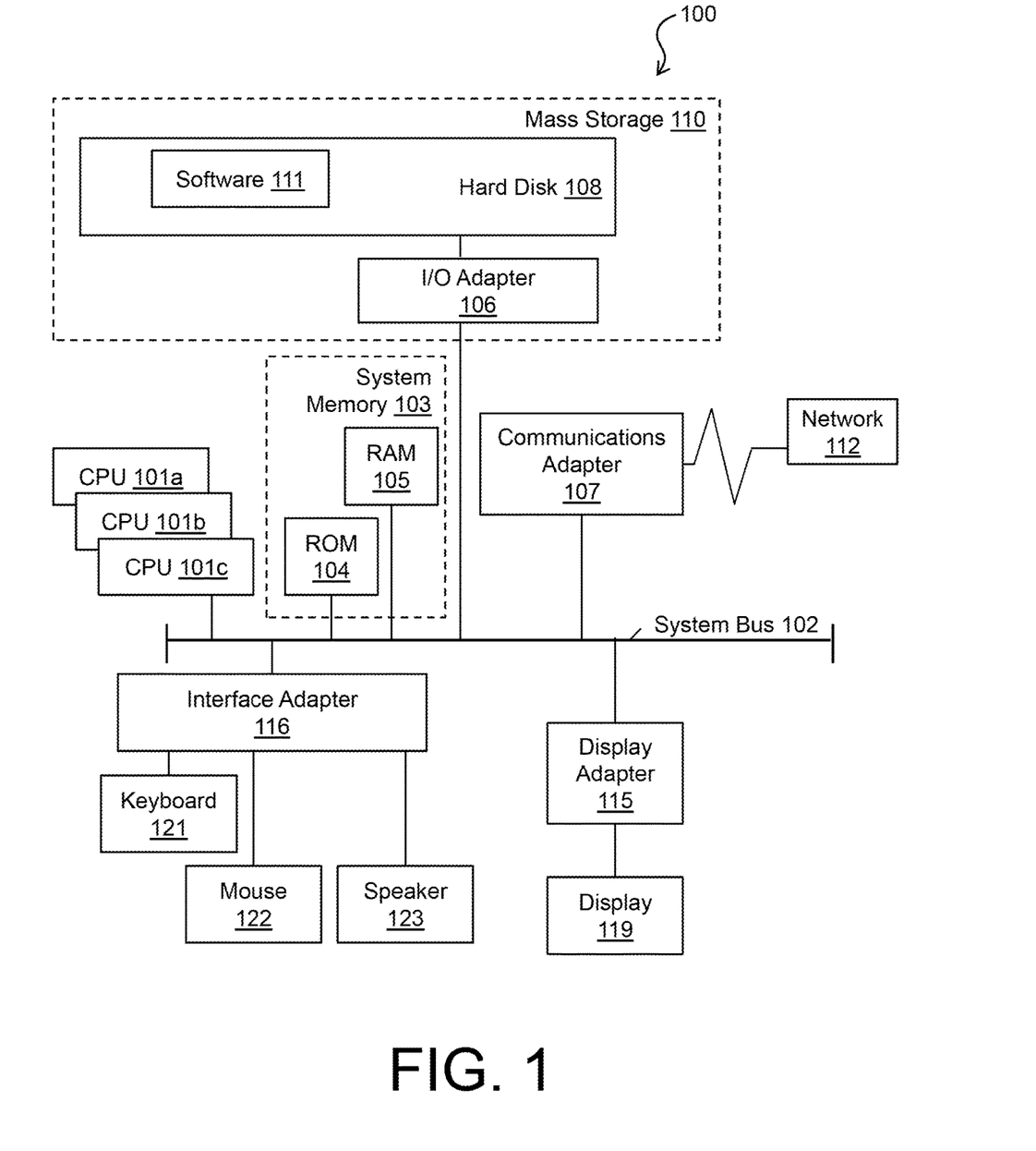
FIG. 1 is a block diagram of an example computer system for use in conjunction with one or more embodiments of noise impact on function (NIOF) reduction for an integrated circuit (IC) design.

Turning now to FIG. 1, a computer system 100 is generally shown in accordance with an embodiment. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc. (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system, such as the z/OS or AIX operating system from IBM Corporation, to coordinate the functions of the various components shown in FIG. 1.

Additional input/output devices are shown as connected to the system bus 102 via a display adapter 115 and an interface adapter 116 and. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by a display adapter 115, which may include a graphics controller to improve the performance of graphics intensive applications and a video controller. A keyboard 121, a mouse 122, a speaker 123, etc. can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
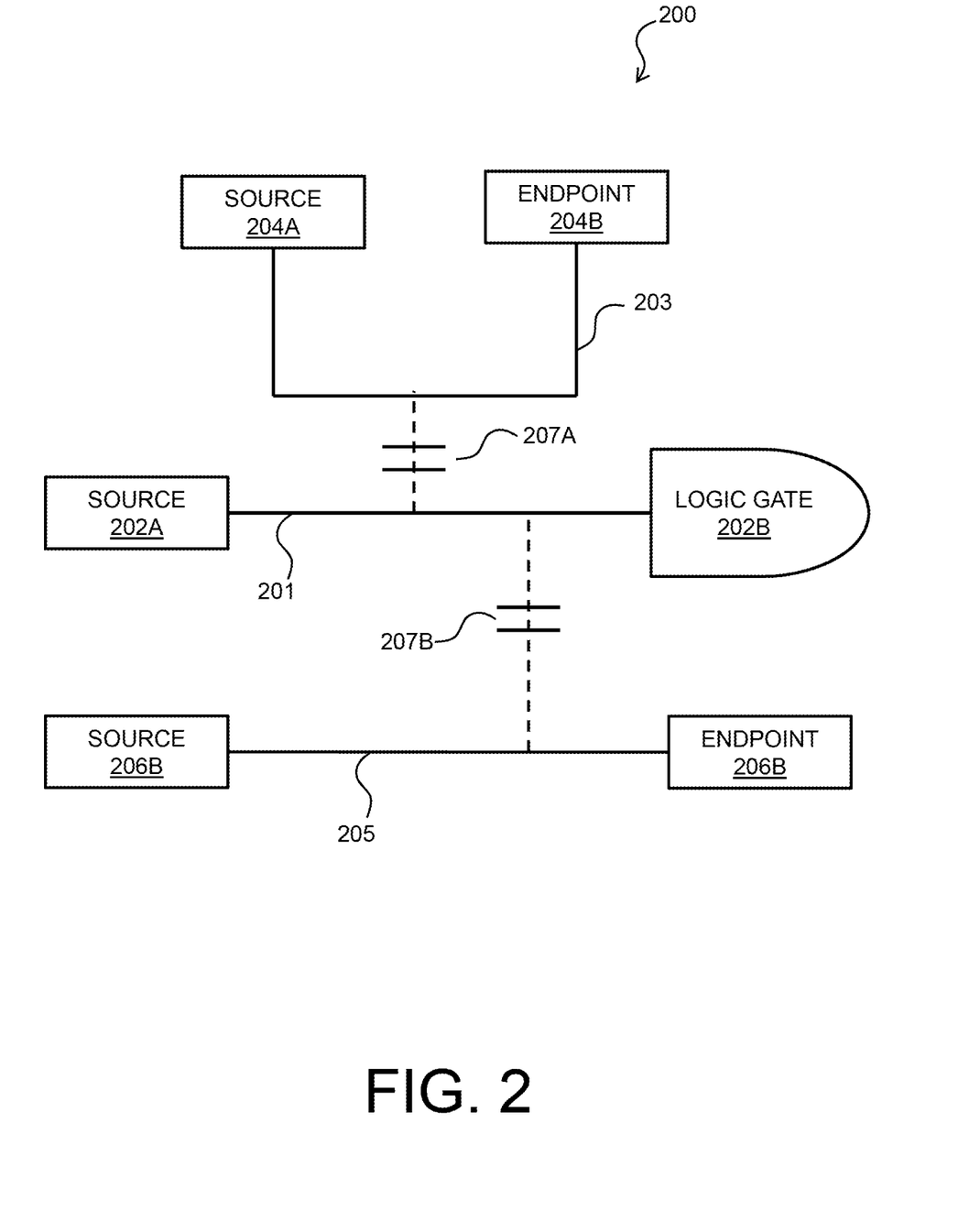
FIG. 2 is a block diagram of components of a system for NIOF reduction for an IC design in accordance with one or more embodiments of the present invention.

Turning now to FIG. 2, a system 200 for NIOF reduction for an IC design is generally shown in accordance with one or more embodiments of the present invention. System 200 illustrates a victim net 201 and aggressor nets 203 and 205. Victim net 201 includes source 202A and logic gate 202B connected by a wire. Due to noise induced in victim net 201 by aggressor nets 203 and 205, an output of the logic gate 202B may be flipped from its expected value (signal switching). Aggressor net 203 includes source 204A and endpoint 204B connected by a wire, and aggressor net 205 includes source 206A and endpoint 206B connected by a wire. Aggressor net 203 may induce noise in victim net 201 via capacitive coupling 207A between the wire of victim net 201 and the wire of aggressor net 203. Aggressor net 205 may induce noise in victim net 201 via capacitive coupling 207B between the wire of victim net 201 and the wire of aggressor net 205. A NIOF failure in victim net 201 is due to the sum of the individual contributions of both of aggressor net 203 and aggressor net 205. As shown in system 200, capacitive coupling 207A may be greater than capacitive coupling 207B, due to a smaller physical distance between aggressor net 203 and victim net 201 as compared to the distance between aggressor net 205 and victim net 201. In order to correct the NIOF failure in victim net 201, in various embodiments, the noise contributions from both aggressor nets 203 and 205 may be reduced, or only the aggressor net having the greater noise contribution (e.g., net 203) may be targeted for NIOF reduction.

FIG. 2 is shown for illustrative purposes only; in various embodiments, there may be any appropriate number (e.g., 10 or higher) of aggressor nets such as aggressor nets 203 and 205 that are inducing noise in a victim net such as victim net 201. In some embodiments, dominant noise contributors (e.g., aggressor net 203) may be targeted for NIOF reduction before lesser contributors (e.g., aggressor net 205). In embodiments in which a wire optimization technique is used, an aggressor net that may be promoted or demoted to another layer of the IC design with relatively low effect on the rest of the IC design may be targeted for NIOF reduction. Embodiments of NIOF reduction that may be applied in system 200 are discussed in further detail with respect to FIG. 4.

It is to be understood that the block diagram of FIG. 2 is not intended to indicate that the system 200 is to include all of the components shown in FIG. 2. Rather, the system 200 can include any appropriate fewer or additional components not illustrated in FIG. 2 (e.g., nets, logic gates, wires, sources, endpoints, capacitive couplings, wires, additional memory components, embedded controllers, functional blocks, connections between functional blocks, modules, inputs, outputs, etc.). Further, the embodiments described herein with respect to system 200 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 3:
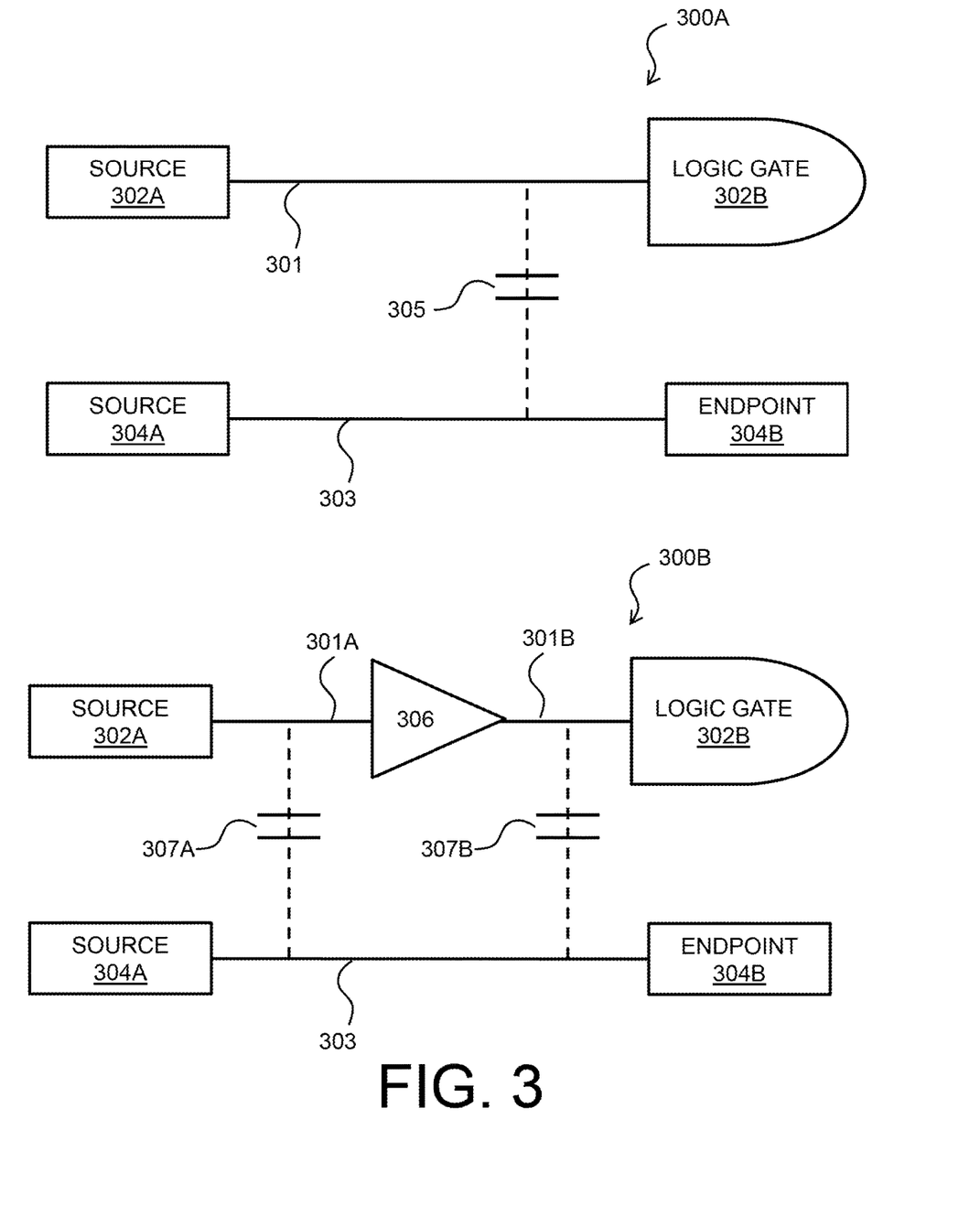
FIG. 3 is a block diagram of components of another system for NIOF reduction for an IC design in accordance with one or more embodiments of the present invention.

FIG. 3 shows another system 300A-B for NIOF reduction for an IC design in accordance with one or more embodiments of the present invention. As shown in system 300A of FIG. 3, a first net 301, which includes a source 302A and a logic gate 302B connected by a wire, may experience a NIOF failure due to capacitive coupling 305 to a second net 303, which includes a source 304A connected to an endpoint 304B. As shown in system 300B, a buffer 306 may be placed in a midpoint of the wire in net 301, between source 302A and logic gate 302B, forming net 301A and net 301B. Buffer 306 may split capacitive coupling 305 of system 300A in half, e.g., into two capacitive couplings 307A (associated with net 301A) and capacitive coupling 307B (associated with net 301B), such that the voltage induced by capacitive coupling 307B at the logic gate 302B in system 300B is reduced as compared to the voltage induced by capacitive coupling 305 at the logic gate 302B in system 300A. However, the presence of the buffer 306 may induce additional noise in the second net 303 (i.e., the original aggressor), i.e. net 301A, and net 301B that is driven by buffer 306, may become aggressor nets to net 303, generating sufficient signal to cause a NIOF failure on endpoint 304B. Other NIOF reduction techniques such as rerouting of a net, gate repowering, and threshold voltage swap in a victim net may also increase noise induced in neighboring nets by the victim net. Therefore, as illustrated in FIG. 3, correction of a NIOF failure in a victim net may create one or more NIOF failures in neighboring nets that previously did not have NIOF failures.

It is to be understood that the block diagram of FIG. 3 is not intended to indicate that the system 300 is to include all of the components shown in FIG. 3. Rather, the system 300 can include any appropriate fewer or additional components not illustrated in FIG. 3 (e.g., additional memory components, embedded controllers, functional blocks, connections between functional blocks, modules, inputs, outputs, etc.). Further, the embodiments described herein with respect to system 300 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 4:
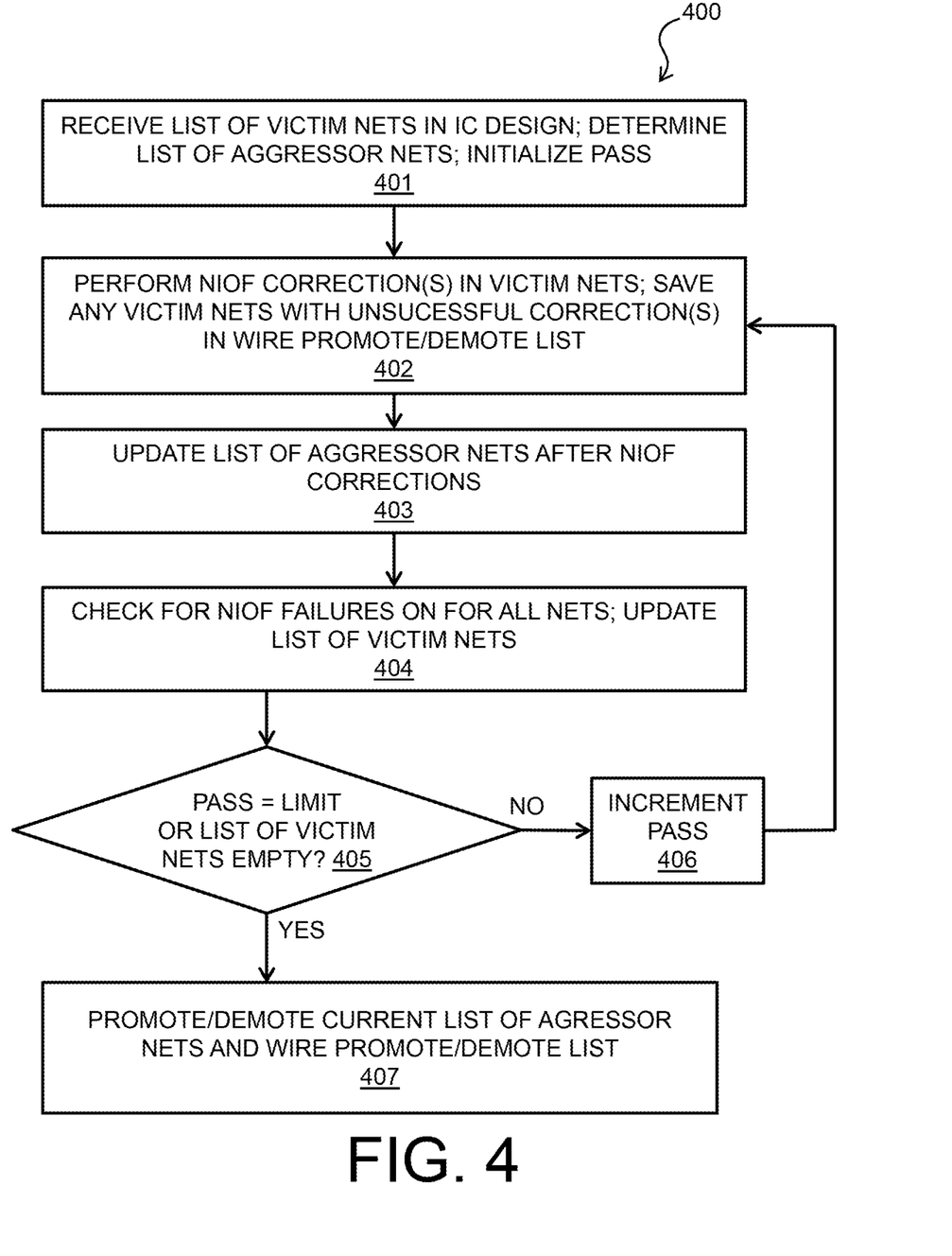
FIG. 4 is a flow diagram of a process for NIOF reduction for an IC design in accordance with one or more embodiments of the present invention.

FIG. 4 shows a process flow diagram of a method 400 for NIOF reduction for an IC design in accordance with one or more embodiments of the present invention. Method 400 may be implemented in conjunction with a computer system such as computer system 100 of FIG. 1; for example, elements of method 400 may be included in software 111 of computer system 100 of FIG. 1. In some embodiments, method 400 may be applied to an IC design after the IC design is fully routed in the physical domain, and after the IC design is determined to be positive in terms of slack. Completion of full routing may be needed in some embodiments to determine relatively accurate 3-dimensional coupling scenarios that allow NIOF analysis according to method 400. In block 401 of method 400, a list of nets in an IC design that are experiencing NIOF failures (i.e., victim nets) are received, and a list of aggressor nets in the IC design that are responsible for the NIOF failures is determined. An amount of noise contribution to a NIOF failure for each aggressor net in the list of aggressor nets may also be determined in block 401. An example of a NIOF failure that is caused in a victim net by multiple aggressor nets is discussed above with respect to FIG. 2. A number of passes may also be initialized in block 401; the number of passes may be incremented with successive iterations of method 400 up to a predetermined limit.

In block 402, NIOF failure correction is performed for the list of victim nets that was received in block 401. The NIOF failure corrections that are performed in block 402 may include but are not limited to gate repower in a victim net, gate threshold voltage (Vt) swap in a victim net, increasing the physical space between a victim net and neighboring nets within a layer of the IC design, and inserting one or more buffers into the victim net to reduce capacitive coupling to neighboring nets. In some embodiments, a buffer may be inserted in the middle of a wire of a victim net in block 402, and the victim net may be repowered. In some embodiments, multiple buffers may be inserted into a wire of a victim net in block 402. The corrections applied to the IC design may be performed in an incremental design environment, in which the changes in the design may be identified and the timing graph updated to register the portions of the IC design that changed. When timing information is requested, the graph needs to be updated, which may trigger various actions depending on the corrections applied in block 402. These triggered actions may include re-routing some nets in the design, 3-dimensional extraction of a net parasitic network, recalculation of timing information including the noise contributions to timing (i.e., NIOT) associated with a net. Depending on the amount of correction performed in block 402 the automatic incremental system may trigger a re-calculation of all noise contributions. However, a NIOF correction may fail in block 402; any victim net corresponding to a failed NIOF correction may be saved to a wire promote/demote list in block 402.

In block 403, it is determined if any nets in the IC design are aggressor nets after the NIOF corrections of block 402, and the list of aggressor nets is updated. For example, a victim net may become an aggressor net in block 403 after a buffer insertion was performed in block 402. An example of noise induced in a neighbor net by a buffer insertion is discussed above with respect to FIG. 3. In block 404, all nets in the IC design are checked for new NIOF failures, and the list of victim nets is updated. A gate input noise estimator may be used in block 404 to determine if a gate will likely switch (i.e., have a NIOF failure) based on the input voltage waveform shape, the maximum voltage, and the width of the signal above a threshold. Sensitivity analysis of all gates in the IC design may be performed in block 404 to determine a maximum voltage and/or signal width above a threshold that will likely make the gate output switch logic level. Any victim net that was added to the wire promote/demote list in block 402 may not be included in the updated list of victim nets in block 404. Flow then proceeds from block 404 to block 405.

In block 405, it is determined whether a number of passes of method 400 is equal to a limit, which is a predetermined number of NIOF reduction passes that may be performed. The limit may be any appropriate number in various embodiments. It is also determined whether the updated list of victim nets in the IC design is empty. If it is determined in block 405 that either the number of passes less than the limit, or the updated list of victim nets in the IC design is not empty, flow proceeds from block 405 to block 406, in which the number of passes is incremented. Flow then returns from block 406 back to block 402, in which further NIOF corrections (e.g., gate repower, gate threshold voltage swap, moving wires within a layer, and/or buffer insertion) are performed. The wire promote/demote list may also be updated in block 402 based on any failed NIOF corrections. The IC design including the further NIOF corrections is then evaluated for further NIOF failures in blocks 403 and 404, and the list of aggressor nets and the list of victim nets are updated. Flow then again returns to block 405 from block 404. Blocks 402, 403, 405, and 406 may be repeated any appropriate number of times based on the number of passes reaching the limit, or the list of victim nets being empty in block 405.

When it is determined in block 405 that either the number of passes is equal to the limit, or the list of victim nets in the IC design is empty, flow proceeds from block 405 to block 407, in which wires that were saved to the wire promote/demote list in block 402 based on unsuccessful NIOF corrections are promoted or demoted. New aggressor nets that were added to the list of aggressor nets in the most recent iteration of block 403 may also be promoted or demoted in block 407. The IC design including the wire promotions and demotions may then be saved and exported in block 407, and method 400 ends. A semiconductor chip may be fabricated based on the IC design that is saved and exported in block 407; fabrication of the semiconductor chip based on the IC design is discussed in further detail below with respect to FIG. 5.

The process flow diagram of FIG. 4 is not intended to indicate that the operations of the method 400 are to be executed in any particular order, or that all of the operations of the method 400 are to be included in every case. Additionally, the method 400 can include any suitable number of additional operations.

Figure 5:
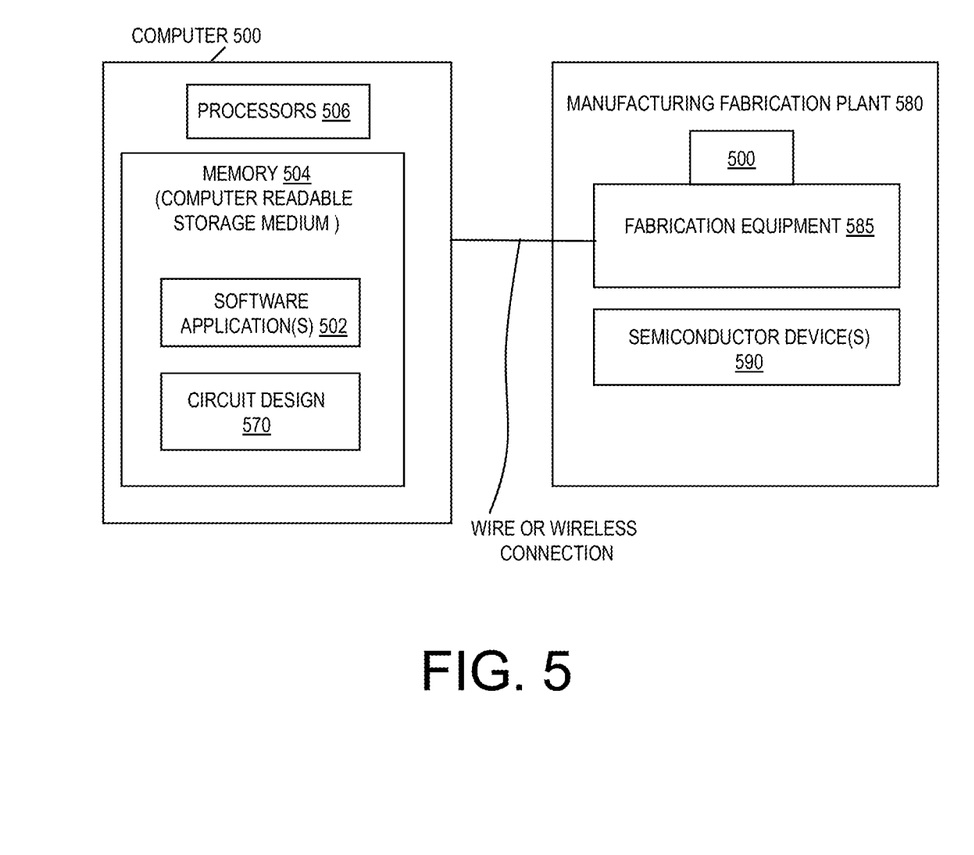
FIG. 5 depicts a system of a computer system integrated with a manufacturing fabrication plant according to embodiments of the invention.

In some embodiments, a semiconductor layout (or IC design) can be generated using the computer system 500 shown in FIG. 5. The computer system 500 has one or more software applications 502 configured to function and implement operations as discussed herein. For example, software applications 502 may include one or more routines for NIOF reduction for an IC design. A semiconductor layout can be constructed by the software application 502 of the computer 500 according to method 400 of FIG. 4, as described above, to build the semiconductor device (e.g., an integrated circuit). The computer 500 is configured to configured to guarantee design rule cleanliness (i.e., pass) for the semiconductor device before and/or without requiring a design rule check. The software applications 502 include, integrate, are coupled to, and/or function as electronic design automation (EDA), also referred to as electronic computer-aided design (ECAD). Electronic design automation is a category of software tools for designing electronic systems such as integrated circuits and printed circuit boards. The tools work together in a design flow that chip designers use to design and analyze entire semiconductor chips. In some implementations, the computer 500 is coupled to, integrated with, and/or part of the fabrication equipment 585 at the manufacturing fabrication plant 580 (so as to communicate with and/or control operations of the fabrication equipment 585) to thereby fabricate semiconductor device(s) 590 as depicted in FIG. 5, as understood by one skilled in the art. The computer 500 includes one or processors 506 configured to execute one or more software applications 502 in memory 504. The computer 500 receives input of a design 570 for the semiconductor device 590, and the computer 500 is configured to develop/form the semiconductor layout for the semiconductor device in order to build the semiconductor device. The semiconductor layout is a physical design released to the manufacturing fabrication (Fab) plant 580 and physically fabricated by the fabrication equipment 585 to produce the semiconductor device 590. The manufacturing fabrication plant 580 builds the photo mask from the semiconductor layout as a physical design, and then builds the actual product using the photo mask. The product is an integrated circuit (i.e., semiconductor device 590) on a wafer according to the semiconductor layout (physical design).

There may be numerous integrated circuits on a wafer, and each integrated circuit may be diced into an individual chip.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    receiving a list of victim nets in which noise impact on function (NIOF) failures are present in an integrated circuit (IC) design;
    attempting NIOF correction in each victim net of the list of victim nets;
    based on a failure of a NIOF correction in at least one victim net of the list of victim nets, saving the at least one victim net to a wire promote/demote list;
    updating the list of victim nets based on the NIOF correction, wherein updating the list of victim nets comprises determining whether a new victim net was caused by the NIOF correction;
    based on determining that the updated list of victim nets is empty, promoting or demoting the at least one victim net from the wire promote/demote list in the IC design.

2. The method of claim 1, wherein the NIOF correction comprises at least one of performing a gate repower in a victim net, performing a gate threshold voltage swap in a victim net, and inserting one or more buffers into a victim net.

3. The method of claim 1, further comprising:
   determining a list of aggressor nets in the IC design based on receiving the list of victim nets; and
   updating the list of aggressor nets based on the NIOF correction.

4. The method of claim 3, further comprising:
   initializing a number of passes based on receiving the list of victim nets; and
   based on determining that the updated list of victim nets is not empty, incrementing the number of passes.

5. The method of claim 4, further comprising, based on determining that the number of passes is equal to a limit, promoting or demoting at least one aggressor net from the updated list of aggressor nets in the IC design.

6. The method of claim 1, further comprising, based on determining that the updated list of victim nets is not empty:
   attempting NIOF correction in each victim net of the updated list of victim nets;
   based on a failure of a NIOF correction in at least one victim net of the updated list of victim nets, saving the at least one victim net to a wire promote/demote list;
   updating the updated list of victim nets based on the NIOF correction.

7. The method of claim 1, wherein promoting the at least one victim net from the wire promote/demote list comprises moving a wire of the at least one victim net to a higher layer in the IC design, and wherein demoting the at least one victim net from the wire promote/demote list comprises moving a wire of the at least one victim net to a lower layer in the IC design.

8. A system comprising:
   a memory having computer readable instructions; and
   one or more processors for executing the computer readable instructions, the computer readable instructions controlling the one or more processors to perform operations comprising:
      receiving a list of victim nets in which noise impact on function (NIOF) failures are present in an integrated circuit (IC) design;
      attempting NIOF correction in each victim net of the list of victim nets;
      based on a failure of a NIOF correction in at least one victim net of the list of victim nets, saving the at least one victim net to a wire promote/demote list;
      updating the list of victim nets based on the NIOF correction, wherein updating the list of victim nets comprises determining whether a new victim net was caused by the NIOF correction;
      based on determining that the updated list of victim nets is empty, promoting or demoting the at least one victim net from the wire promote/demote list in the IC design.

9. The system of claim 8, wherein the NIOF correction comprises at least one of performing a gate repower in a victim net, performing a gate threshold voltage swap in a victim net, and inserting one or more buffers into a victim net.

10. The system of claim 8, further comprising:
    determining a list of aggressor nets in the IC design based on receiving the list of victim nets; and
    updating the list of aggressor nets based on the NIOF correction.

11. The system of claim 10, further comprising:
    initializing a number of passes based on receiving the list of victim nets; and
    based on determining that the updated list of victim nets is not empty, incrementing the number of passes.

12. The system of claim 11, further comprising, based on determining that the number of passes is equal to a limit, promoting or demoting at least one aggressor net from the updated list of aggressor nets in the IC design.

13. The system of claim 8, further comprising, based on determining that the updated list of victim nets is not empty:
    attempting NIOF correction in each victim net of the updated list of victim nets;
    based on a failure of a NIOF correction in at least one victim net of the updated list of victim nets, saving the at least one victim net to a wire promote/demote list;
    updating the updated list of victim nets based on the NIOF correction.

14. The system of claim 8, wherein promoting the at least one victim net from the wire promote/demote list comprises moving a wire of the at least one victim net to a higher layer in the IC design, and wherein demoting the at least one victim net from the wire promote/demote list comprises moving a wire of the at least one victim net to a lower layer in the IC design.

15. A computer program product comprising a computer readable storage medium having program instructions embodied therewith, the program instructions executable by a processor to cause the processor to perform operations comprising:
    receiving a list of victim nets in which noise impact on function (NIOF) failures are present in an integrated circuit (IC) design;
    attempting NIOF correction in each victim net of the list of victim nets;
    based on a failure of a NIOF correction in at least one victim net of the list of victim nets, saving the at least one victim net to a wire promote/demote list;
    updating the list of victim nets based on the NIOF correction wherein updating the list of victim nets comprises determining whether a new victim net was caused by the NIOF correction;
    based on determining that the updated list of victim nets is empty, promoting or demoting the at least one victim net from the wire promote/demote list in the IC design.

16. The computer program product of claim 15, wherein the NIOF correction comprises at least one of performing a gate repower in a victim net, performing a gate threshold voltage swap in a victim net, and inserting one or more buffers into a victim net.

17. The computer program product of claim 15, further comprising:
    determining a list of aggressor nets in the IC design based on receiving the list of victim nets; and
    updating the list of aggressor nets based on the NIOF correction.

18. The computer program product of claim 17, further comprising:
    initializing a number of passes based on receiving the list of victim nets; and
    based on determining that the updated list of victim nets is not empty, incrementing the number of passes.

19. The computer program product of claim 18, further comprising, based on determining that the number of passes is equal to a limit, promoting or demoting at least one aggressor net from the updated list of aggressor nets in the IC design.

20. The computer program product of claim 15, further comprising, based on determining that the updated list of victim nets is not empty:
- attempting NIOF correction in each victim net of the updated list of victim nets;
- based on a failure of a NIOF correction in at least one victim net of the updated list of victim nets, saving the at least one victim net to a wire promote/demote list;
- updating the updated list of victim nets based on the NIOF correction.

\* \* \* \* \*